(12) United States Patent
Michimori et al.

(10) Patent No.: US 7,880,965 B2
(45) Date of Patent: Feb. 1, 2011

(54) PROJECTION-TYPE IMAGE DISPLAY DEVICE

(75) Inventors: Atsushi Michimori, Tokyo (JP); Norihiro Watanabe, Tokyo (JP); Masao Narita, Tokyo (JP); Hideaki Arita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 262 days.

(21) Appl. No.: 12/222,273

(22) Filed: Aug. 6, 2008

(65) Prior Publication Data

US 2009/0109530 A1 Apr. 30, 2009

(30) Foreign Application Priority Data

Oct. 29, 2007 (JP) .............................. 2007-280742
Feb. 27, 2008 (JP) .............................. 2008-046322

(51) Int. Cl.
*G03B 21/56* (2006.01)
(52) U.S. Cl. ........................................ 359/446
(58) Field of Classification Search ................. 359/443, 359/446
See application file for complete search history.

(56) References Cited

U.S. PATENT DOCUMENTS 7,688,506 B2 * 3/2010 Sugawara et al. ........... 359/446
2007/0247707 A1 * 10/2007 Michimori et al. .......... 359/446
2008/0037117 A1 * 2/2008 Seki et al. .................... 359/446
2009/0009860 A1 * 1/2009 Marshall ...................... 359/446
2009/0141347 A1 * 6/2009 Mehrl et al. ................. 359/446

FOREIGN PATENT DOCUMENTS

| JP | 55-065940 A | 5/1980 |
|---|---|---|
| JP | 08-262565 | 10/1996 |
| JP | 2002-090881 A | 3/2002 |
| JP | 2006-343663 A | 12/2006 |
| JP | 2007-199292 A | 8/2007 |
| JP | 2007-241023 A | 9/2007 |
| JP | 2007-241024 A | 9/2007 |
| JP | 2007-286347 A | 11/2007 |
| JP | 2007-286350 A | 11/2007 |
| JP | 2008-083687 A | 4/2008 |

* cited by examiner

*Primary Examiner*—Christopher Mahoney
(74) *Attorney, Agent, or Firm*—Birch, Stewart, Kolasch and Birch, LLP

(57) ABSTRACT

In a projection-type image display device, a driven member of a screen is displaced in a plane parallel to the screen. The driven member can be a Fresnel lens or a diffusing member. An elastic retaining unit holds the driven member in such a manner as to be capable of moving in the plane parallel to the screen, and a pair of driving sources applies driving forces in mutually intersecting directions to the driven member. A control circuit drives the pair of driving sources with driving waveforms having a prescribed phase difference therebetween so that the driven member makes continuous motion in a plane parallel to the screen when an image is projected.

8 Claims, 9 Drawing Sheets

PROJECTION-TYPE IMAGE DISPLAY DEVICE

BACKGROUND OF THE INVENTION

1. Field of the Invention

The present invention relates to projection-type image display devices, and more particularly, to a projection-type image display device provided with a scintillation-reducing function.

2. Description of the Related Art

In projection-type image display devices, such as rear-projection televisions, lamps or laser oscillators are used as light sources. When a laser oscillator is used as the light source, it is comparatively straightforward to realize a projection-type image display device with a brightness high enough to allow clear images to be displayed even in bright rooms. However, when a laser oscillator is used as the light source, so-called scintillation, a screen glare phenomenon due to a speckle pattern, becomes noticeable as compared with displays in which lamps are used as the light sources.

Conventional methods of reducing the scintillation involve vibrating the screen in a direction perpendicular to the image display surface of the screen, in the longitudinal direction of the screen, or in the lateral direction of the screen, or alternatively, vibrating the laser beam on the screen in a direction at right angles to the optical axis as disclosed, for example, in Japanese Patent Application Laid-open No. S55-65940. The screen is vibrated in the directions described above with a vibrating device that includes a bimorph, motor, or the like, and the laser beam is vibrated in the direction described above by reflecting the laser beam towards the screen with a vibrating mirror attached to a vibrating device or by deflecting the laser beam in front of the screen with a deflecting device attached to a vibrating device, or alternatively, by vibrating the laser light source itself.

However, when the screen is vibrated in a direction perpendicular to the image display surface of the screen (the normal direction), image jitter occurs and the resolution is reduced, thus reducing the image quality as a result. Moreover, when the screen is vibrated in the longitudinal direction or the lateral direction thereof, the screen momentarily stops at the positions of maximum displacement from the origin where the oscillating direction reverses, thus producing strong scintillation at those points. The same also applies when vibrating the laser beam in directions at right angles to the optical axis.

SUMMARY OF THE INVENTION

It is an object of the present invention to at least partially solve the problems in the conventional technology.

According to an aspect of the present invention, there is provided a projection-type image display device including an optical engine that emits light in response to an image signal; a screen that includes a Fresnel lens that converts the light incident thereon from the optical engine to substantially collimated light, and a diffusing member that converts the collimated light incident thereon from the Fresnel lens to a diffuse light; a screen driving unit that displaces any of the Fresnel lens and the diffusing member, serving as a driven member, in a plane parallel to the screen; and a housing that accommodates the optical engine, the screen, and the screen driving unit. The screen driving unit includes an elastic retaining unit that is supported on the housing and that holds the driven member so as to be capable of displacing in the plane parallel to the screen; a pair of driving sources that apply driving forces to the elastic retaining unit in mutually intersecting directions; and a control circuit that drives the pair of driving sources with driving waveforms having a prescribed phase difference therebetween. When projecting an image on the screen, the driving forces are applied to the elastic retaining unit from the pair of driving sources to cause the driven member to make continuous motion in the plane parallel to the screen.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be described in detail below with reference to the accompanying drawings. The present invention, however, is not limited to the embodiments described below.

Figure 1:
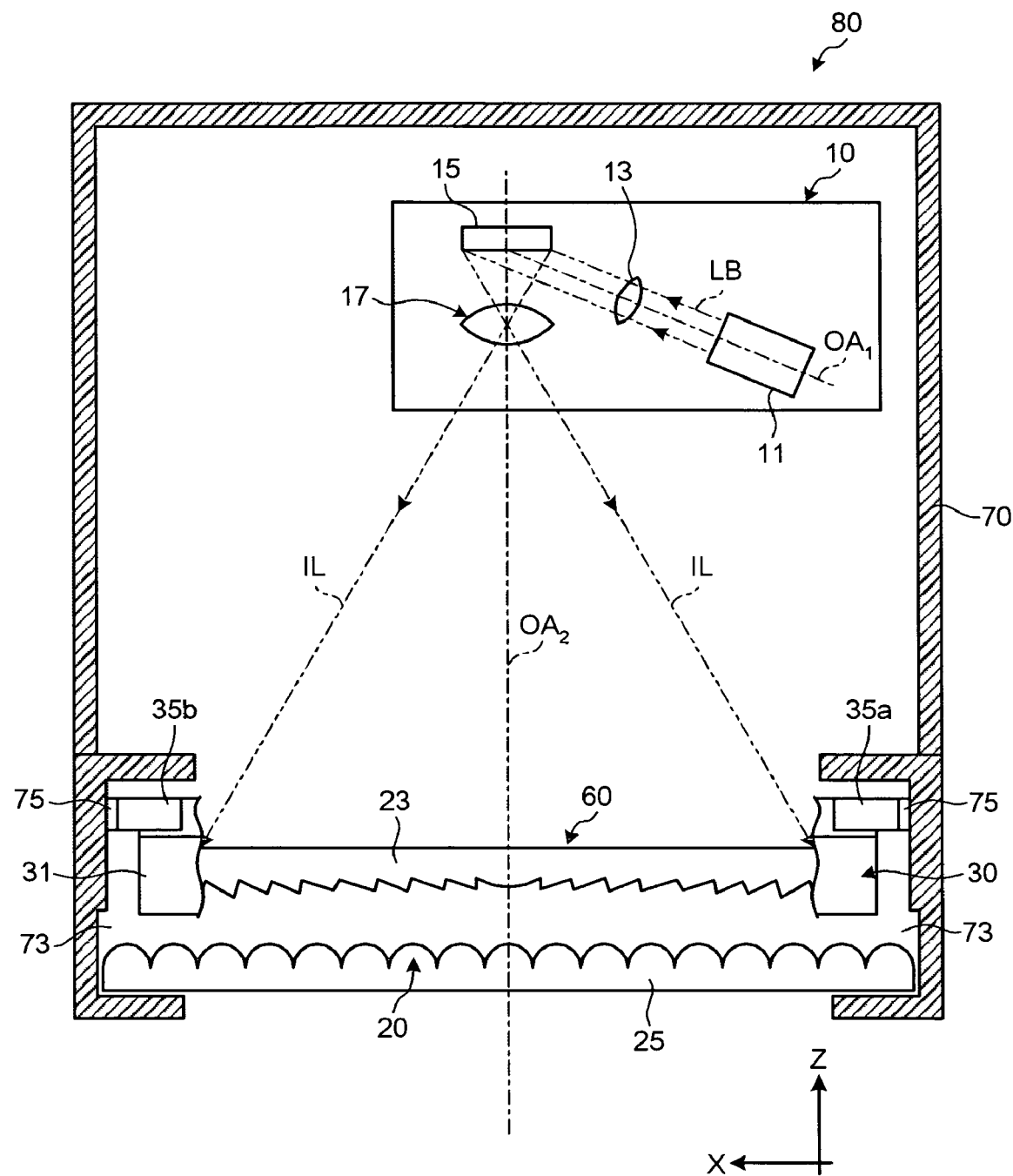
FIG. 1 is a-partially cutaway sectional view of a projection-type image display device according to a first embodiment of the present invention.
Figure 2:
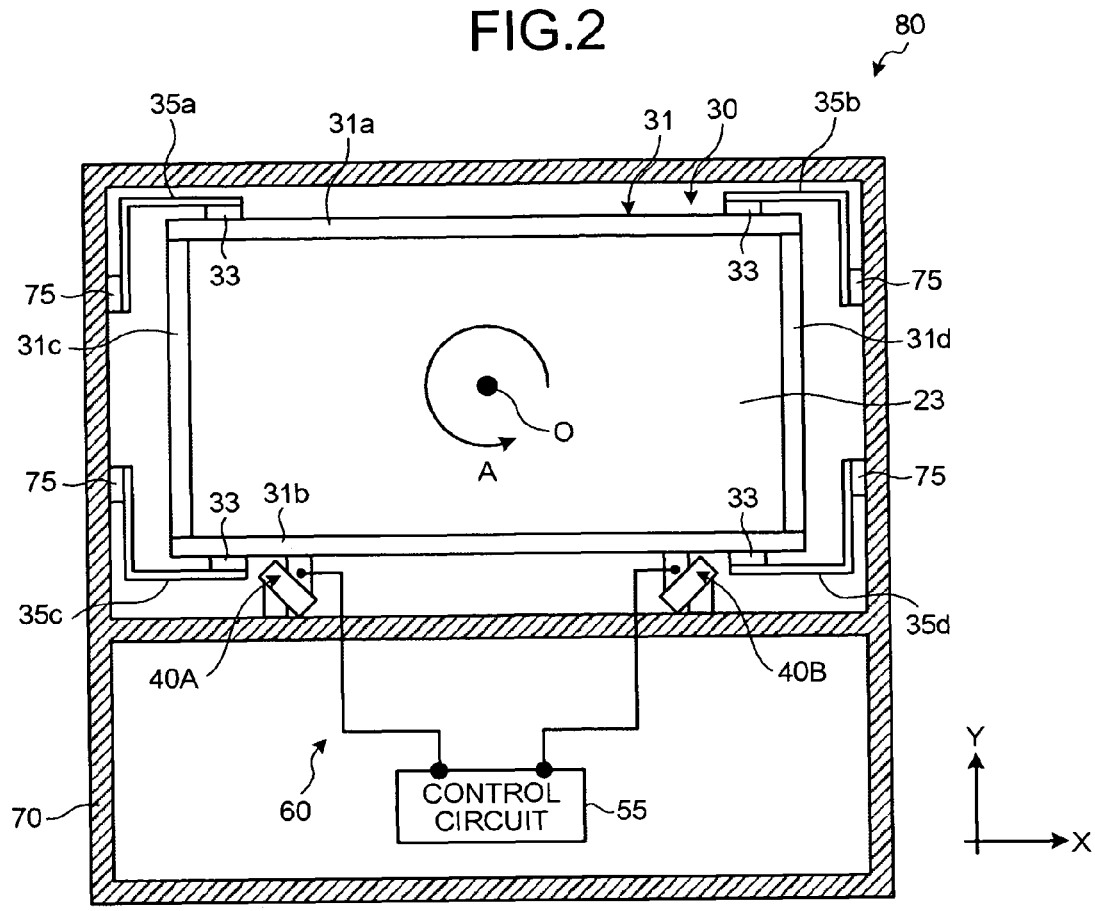
FIG. 2 is a sectional view of the internal configuration of the projection-type image display device shown in FIG. 1.

FIG. 1 is a partially cutaway sectional view of a projection-type image display device 80 according to a first embodiment of the present invention, and FIG. 2 is a sectional view of the internal configuration of the projection-type image display device 80. The projection-type image display device 80 includes an optical engine 10, a screen 20, a screen driving unit 60, and a housing 70 accommodating these components. The projection-type image display device 80 performs image display by projecting light emitted from the optical engine 10 in response to an image signal onto the screen 20, from the rear side of the screen 20.

The optical engine 10 includes a laser module 11 containing a laser oscillator (not shown) that emits a laser beam LB, a relay lens 13 that controls the light path of the laser beam LB, a spatial modulator device 15 that spatially modulates the laser beam LB according to the image signal to form image light IL, and a projection optical system 17 that magnifies the image light IL and projects it onto the screen 20. A micro mirror device can be used as the spatial modulator device 15. A micro mirror device is a device that has a large number of minute mirrors with variable angles arranged in an array and it can spatially modulate a laser beam (i.e., the laser beam LB) by adjusting the angle of each minute mirror in response to an control signal (i.e., the image signal). For the sake of convenience, the projection optical system 17 is represented by a single lens in FIG. 1. The one-dot chain lines $OA_1$ and $OA_2$ in the same figure indicate optical axes.

The screen 20 includes a Fresnel lens 23 and a diffusing member 25. The Fresnel lens 23 is located on the optical engine 10 side, and the image light IL is incident thereon from the optical engine 10. The diffusing member 25 is located closer to the observer side than the Fresnel lens 23, and light emerging from the Fresnel lens 23 is incident thereon. The Fresnel lens 23 is held by an elastic retaining unit 30 and makes the image light IL incident from the optical engine 10 emerge therefrom in the form of a substantially collimated beam. The diffusing member 25 is formed, for example, of a lenticular lens sheet, a scattering layer, a light blocking layer, or the like; is secured to a groove-shaped diffusing-member holder 73 formed in the housing 70; and makes the image light IL, incident in the form of a substantially collimated beam by the Fresnel lens 23, emerge therefrom as diffuse light. Making the image light IL emitted from the optical engine 10 finally emerge as diffuse light with the diffusing member 25 increases the viewing angle of the image on the screen 20.

As shown in FIG. 1 or FIG. 2, the screen driving unit 60 includes the elastic retaining unit 30 that holds the Fresnel lens 23, a pair of driving sources 40A and 40B, and a control circuit 55. By applying prescribed driving forces to the elastic retaining unit 30 with the driving sources 40A and 40B in response to a driving signal from the control circuit 55 when the image is projected from the optical engine 10, the Fresnel lens 23 is made to undergo continuous motion in a plane parallel to the screen 20. In the present specification, the term "continuous motion" means motion with a velocity greater than 0, while the direction of motion varies, like circular motion, for instance.

The elastic retaining unit 30 includes a Fresnel frame 31 for holding the Fresnel lens 23, and four elastic support members 35a to 35d that mount the Fresnel frame 31 to the housing 70. As shown in FIG. 2, the Fresnel frame 31 includes a top rail 31a, a bottom rail 31b, a right rail 31c, and a left rail 31d. Moreover, four securing portions 33 for securing the Fresnel frame 31 to the elastic support members 35a to 35d are provided at the right and left ends of the top rail 31a and at the right and left ends of the bottom rail 31b.

One end of the elastic support member 35a is secured to the securing portion 33 disposed at the right end of the top rail 31a, and one end of the elastic support member 35b is secured to the securing portion 33 disposed at the left end thereof. Likewise, one end of the elastic support member 35c is secured to the securing portion 33 disposed at the right end of the bottom rail 31b, and one end of the elastic support member 35d is secured to the securing portion 33 disposed at the left end thereof. Other ends of the elastic support members 35a to 35d are secured to the housing 70 via mounting portions 75.

The elastic support members 35a to 35d are positioned so as to be axisymmetric, with the left/right axis (hereinafter, "X axis") and the up/down axis (hereinafter, "Y axis") of the screen 20 defining the axes of symmetry, and so that the spring constants thereof have the same value in both the X-axis direction and the Y-axis direction. The elastic retaining unit 30 is mounted to the housing 70 with these four elastic support members 35a to 35d so as to be supported on the housing 70. The X-axis and the Y-axis are both indicated in FIG. 2.

The driving sources 40A and 40B in the screen driving unit 60 apply driving forces to the elastic retaining unit 30 in mutually intersecting directions. Linear actuators formed, for example, of linear motors or the like can be used as the driving sources 40A and 40B. The control circuit 55 in the screen driving unit 60 supplies prescribed driving signals to the driving sources 40A and 40B.

By supplying the prescribed driving signals to the driving sources 40A and 40B from the control circuit 55 when projecting an image, the screen driving unit 60 causes continuous motion of the Fresnel lens 23, serving as a driven member, in a plane parallel to the screen 20. A concrete example of the motion at this time is, for instance, elliptical motion (including circular motion). When the screen driving unit 60 is constructed so that the driving forces are applied by the driving sources 40A and 40B in directions passing through a center of mass O of the Fresnel lens 23 held by the elastic retaining unit 30, it is easy to eliminate the influence of moments when the Fresnel lens 23 performs continuous motion in the plane parallel to the screen 20.

The phrase "the center of mass of the Fresnel lens held by the elastic retaining unit" means the center of mass of the assembly formed of the elastic retaining unit 30 and the Fresnel lens 31 held by the elastic retaining unit 30. In this specification, "the center of mass of the Fresnel lens held by the elastic retaining unit" is hereinafter simply referred to as the "center of mass of the Fresnel lens". In FIG. 2, the center of mass described above is indicated by a point O, and one example of the direction of motion of the Fresnel lens 23 is indicated by an arrow A.

In the projection-type image display device 80, by applying driving forces from the driving sources 40A and 40B to the elastic retaining unit 30 that holds the Fresnel lens 23, the Fresnel lens 23 is caused to perform continuous motion in a plane parallel to the screen 20 when projecting the image; therefore, it is possible to reduce scintillation. Additionally, because it is not necessary to vibrate the Fresnel lens 23 or the diffusing member 25 in a direction normal to the image surface of the screen 20 (front-to-back axial direction; hereinafter "Z-axis direction"), a reduction in image quality caused by image jitter or a drop in resolution is unlikely to occur. Therefore, it is straightforward to reduce the occurrence of scintillation without causing a reduction in image quality.

In the following description, after describing the constituent parts of the screen driving unit 60 in a concrete fashion with reference to FIGS. 3 to 6, the method of driving the Fresnel lens 23 with the screen driving unit 60 will be described with reference to FIGS. 7 to 11.

Figure 3:
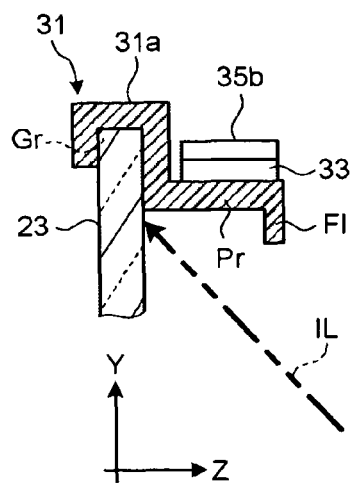
FIG. 3 is a schematic diagram showing an example of the cross-sectional shape of a Fresnel frame in an elastic retaining unit constituting a screen driving unit in the projection-type image display device shown in FIGS. 1 and 2.

FIG. 3 is an exemplary cross-sectional shape of the Fresnel frame 31. An example of the cross-sectional shape of the top rail 31a of the Fresnel frame 31 is schematically shown in the same figure. The top rail 31a includes a groove Gr into which the peripheral edge of the Fresnel lens 23 is inserted and secured, a protrusion Pr formed to protrude rearward from the groove Gr along the Z-axis, and a flange F1 formed to protrude inward from the protrusion Pr, along the Y-axis. The flange F1 is formed at a position and to a length so that it does not obstruct the image light IL from the optical engine 10 (see FIG. 1). The securing portion 33 to which one end of the elastic support member 35a or the elastic support member 35b (see FIG. 2) is secured is arranged at a prescribed location on the outer surface of the protrusion Pr. The elastic support member 35b and the securing portion 33 securing the elastic support member 35b to the top rail 31a are shown in FIG. 3. Although not illustrated, the bottom rail 31b, the right rail 31c, and the left rail 31d (see FIG. 2) can have the same cross-sectional shape as the top rail 31a.

Figure 4:
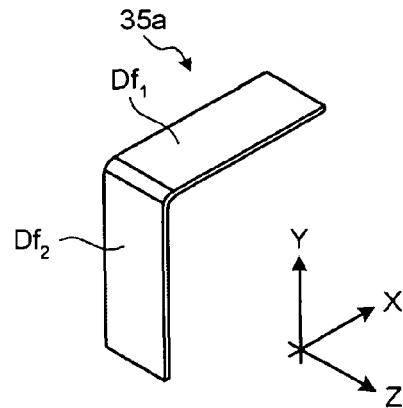
FIG. 4 is a perspective view of an example of an elastic support member in the elastic retaining unit.

As shown in FIG. 4, the elastic support member 35a is an L-shaped member in which flat-plate-shaped first and second deformable portions $Df_1$ and $Df_2$ are joined together at one end thereof. The other end of the first deformable portion $Df_1$ is secured to the Fresnel frame 31 (i.e., the right end of the top rail 31a), and the other end of the second deformable portion $Df_2$ is secured to the mounting portion 75 (see FIG. 2).

The first deformable portion $Df_1$ is parallel to the X-axis, and this first deformable portion $Df_1$ has flexibility in the Y-axis direction. The second deformable portion $Df_2$ is parallel to the Y-axis, and this second deformable portion $Df_2$ has flexibility in the X-axis direction.

The elastic support member 35a is designed and secured so that the spring constant in the X-axis direction and the spring constant in the Y-axis direction have the same value when the elastic support member 35a is secured to both the Fresnel frame 31 and the housing 70. Additionally, the angle between the first deformable portion $Df_1$ and the second deformable portion $Df_2$ is designed so that the first deformable portion $Df_1$ and the second deformable portion $Df_2$ form an angle of substantially 90 degrees when receiving the weight of the Fresnel lens 23, the Fresnel frame 31, and so on. The other elastic support members 35b to 35d are also designed on the same technical principle as the elastic support member 35a, and their shapes can be the same as that of the elastic support member 35a. The elastic retaining unit 30 holds the Fresnel lens 23 with the elastic forces of these elastic support members 35a to 35d, these elastic forces being isotropic in a plane parallel to the screen.

Figure 5:
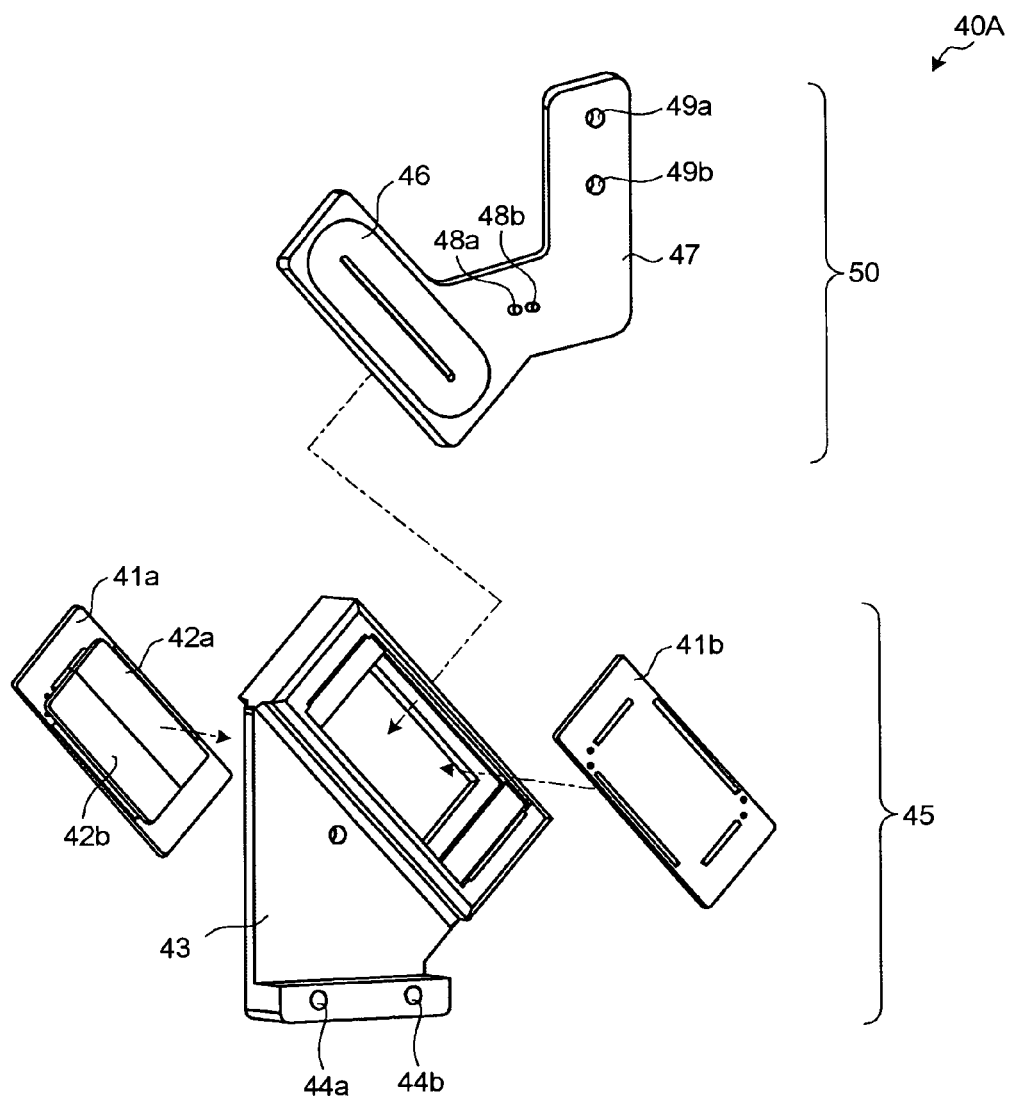
FIG. 5 is an exploded perspective view schematically showing an example of a driving source constituting the screen driving unit.

As shown in FIG. 5, the driving source 40A is a linear actuator formed of a linear motor provided with a static element 45 and a movable element 50. The static element 45 includes two yoke plates 41a and 41b, two magnets 42a and 42b secured to the yoke plate 41a, and a resin yoke holder 43 for holding the yoke plates 41a and 41b while maintaining a prescribed gap therebetween. The yoke plates 41a and 41b are flat-plate-shaped, and the magnets 42a and 42b are also flat-plate-shaped. The yoke plate 41a is placed on the yoke holder 43, with the magnets 42a and 42b at the inner side, and the yoke plate 41b is placed on the yoke holder 43 so as to be away from the magnets 42a and 42b and facing the yoke plate 41a. Mounting holes 44a and 44b are formed in the yoke holder 43. The static element 45 is secured to the housing 70 (see FIG. 2) by means of securing parts (not shown), such as screws, which are inserted in the mounting holes 44a and 44b.

The movable element 50, on the other hand, includes a coil 46, a resin coil holder 47 integrally molded with the coil 46, and supply terminals 48a and 48b provided on the coil holder 47 and connected to the coil 46. Mounting holes 49a and 49b are formed in the coil holder 47. The movable element 50 is placed on the static element 45, with the coil 46 being interposed between the two yoke plates 41a and 41b in the static element 45, and is secured to the Fresnel frame 31 (see FIG. 2) by securing parts, such as screws (not shown), which are inserted in the mounting holes 49a and 49b. The drawing of the driving source 40B has been omitted, because, it has the same structure as that of the driving source 40A.

Figure 6:
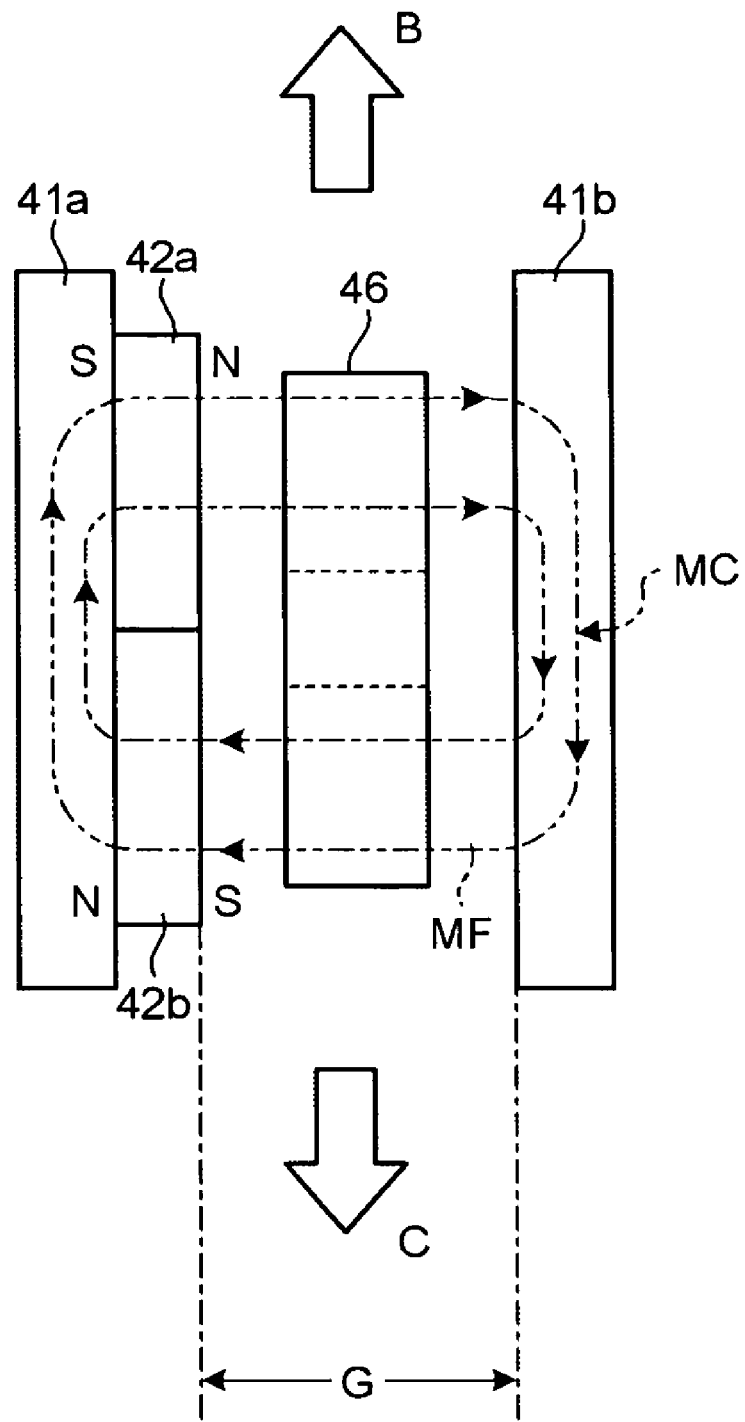
FIG. 6 is a conceptual diagram for explaining the operating principle of the driving source shown in FIG. 5.

FIG. 6 is a conceptual diagram for explaining the operating principle of the driving source 40A. The magnet 42a, which is located at the Fresnel frame 31 side (see FIG. 2), is oriented with the yoke plate 41a side thereof serving as an S pole and the coil 46 side thereof serving as an N pole and is thus fixed to the yoke plate 41a. The magnet 42b, which is located at the housing 70 side (see FIG. 2), is oriented with the yoke plate 41a side thereof serving as an N pole and the coil 46 side thereof serving as an S pole and is thus fixed to the yoke plate 41a. With this arrangement, a magnetic circuit MC starting from the magnet 42a, passing via the yoke plate 41b, the magnet 42b, and the yoke plate 41a, and returning to the magnet 42a is formed in the static element 45. A magnetic flux MF is formed in a gap G between the yoke plate 41b and both of the magnets 42a and 42b.

When the movable element 50 is placed on the static element 45 (see FIG. 5) and the coil 46 is energized, a force in a prescribed direction is generated according to Fleming's left-hand rule. For example, when an electrical current oriented from the rear to the front of the plane of the page in FIG. 6 flows in the coil 46, a force directed along arrow B acts on the coil 46. Conversely, when an electrical current directed from the front to the rear of the plane of the page in FIG. 6 flows in the coil 46, a force directed along arrow C acts on the coil 46. By controlling the direction and magnitude of the current flowing in the coil, it is possible to apply a tensile force or a compressive force (hereinafter, "driving force") with prescribed direction and magnitude from the driving source 40A to the Fresnel frame 31. The movable element 50 can slide in a direction orthogonal to the direction in which the driving force is generated, within a plane orthogonal to the magnetic flux MF, even when the coil 46 is energized.

When the driving source 40B has the same configuration as that of the driving source 40A, for the same reason as described above, it is possible to apply a driving force with prescribed direction and magnitude from the driving source 40B to the Fresnel frame 31 by controlling the direction and magnitude of the current flowing in the coil.

As already described with reference to FIG. 2, the Fresnel lens 23 held in the Fresnel frame 31 of the elastic retaining unit 30 is movable within a plane parallel to the screen 20, and the driving sources 40A and 40B apply driving forces to the elastic retaining unit 30 (the Fresnel frame 31) in mutually intersecting directions. Thus, as described above, the directions and magnitudes of the driving forces which the driving sources 40A and 40B apply to the elastic retaining unit 30 can be controlled according to the direction and magnitude of the currents flowing in the coils 46.

Therefore, by suitably controlling the directions and magnitudes of the currents flowing in the coils 46 of the driving sources 40A and 40B with the control circuit 55 (see FIG. 2), it is possible to cause the Fresnel lens 23 to make continuous motion in a plane parallel to the screen 20. In the following description, the method of driving the Fresnel lens 23 with the screen driving unit 60 (see FIG. 2) will be described in detail with reference to FIGS. 7 to 11.

Figure 7:
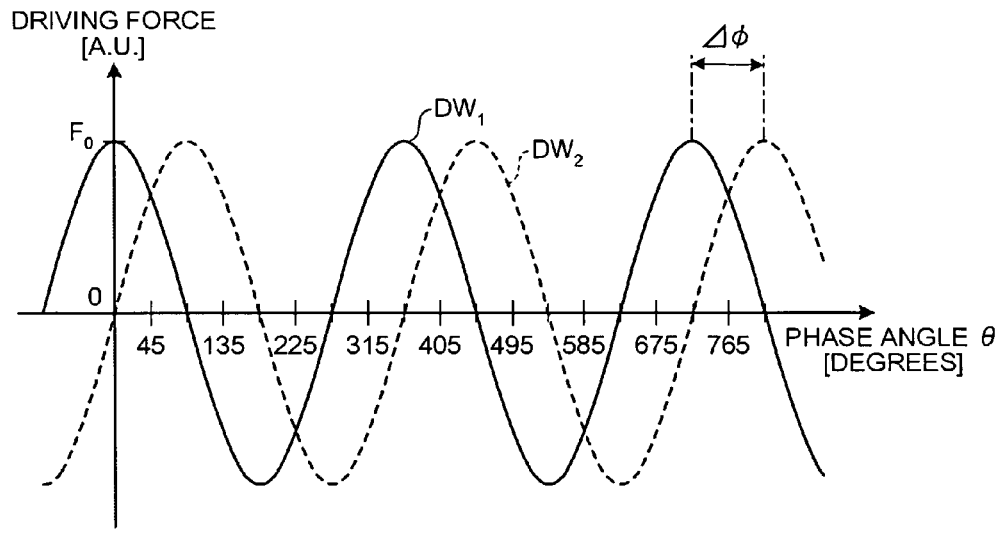
FIG. 7 are examples of driving waveforms of a pair of driving sources in the projection-type image display device shown in FIGS. 1 and 2.

FIG. 7 depicts exemplary driving waveforms of the driving sources 40A and 40B assuming that each driving source 40A and 40B is positioned so that the directions of the driving forces on the elastic retaining unit form an angle of 90 degrees to each other. A driving waveform $DW_1$ represents a driving waveform of the driving source 40A, and a driving waveform $DW_2$ represents a driving waveform of the driving source 40B (see FIG. 2). The horizontal axis is the phase angle $\theta$, and the vertical axis is the driving force applied to the elastic retaining unit 30 (see FIG. 2) from the individual driving sources 40A and 40B. The driving force on the vertical axis is defined as positive for a tensile force applied to the elastic retaining unit 30, and negative for a compressive force.

The driving waveforms $DW_1$ and $DW_2$ are sinusoidal waveforms having the same amplitude and wavelength, but a phase difference $\Delta\phi$ of 90 degrees. A driving force $Fa(\theta)$ applied to the elastic retaining unit 30 from the driving source 40A at this time is a function of the phase angle $\theta$, as given by Equation (i) below:

$$Fa(\theta) = F_0 \cdot \sin(\theta + 90°) = F_0 \cdot \cos\theta \qquad \text{(i)}$$

Similarly, a driving force $Fb(\theta)$ applied to the elastic retaining unit 30 from the driving source 40B is also a function of the phase angle $\theta$, as given by Equation (ii) below:

$$Fb(\theta) = F_0 \cdot \sin\theta \qquad \text{(ii)}$$

The resultant force F of these driving forces $Fa(\theta)$ and $Fb(\theta)$ actually acts on the center of mass O of the Fresnel lens 23 (see FIG. 2).

The term $F_0$ in Equations (i) and (ii) represents a reference force of the driving forces $Fa(\theta)$ and $Fb(\theta)$; the magnitude of this force $F_0$ is selected in advance in view of the elastic forces of the elastic support members 35a to 35d constituting the elastic retaining unit 30 (see FIG. 2), the width of an allowable moving range of the center of mass O (see FIG. 2) when the Fresnel lens 23 performs continuous motion, and so forth.

Figure 8:
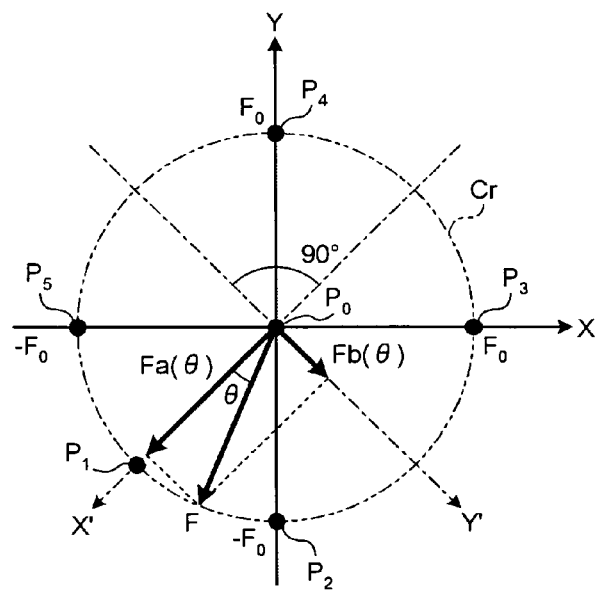
FIG. 8 is a conceptual diagram showing an example of the relationship between the phase angle and the force acting on the center of mass of the Fresnel lens when the driving sources are driven with the respective driving waveforms shown in FIG. 7.

FIG. 8 is a conceptual diagram showing an example of the relationship between the phase angle and the force acting on the center of mass of the Fresnel lens when the driving sources are driven with the driving waveforms shown in FIG. 7. This figure shows the X-axis and the Y-axis of the screen 20 (see FIG. 1), an X'-axis corresponding to the line of action of the driving force applied to the Fresnel lens 23 via the elastic retaining unit 30 when the driving source 40A is driven with the driving waveform $DW_1$ shown in FIG. 7, and a Y'-axis corresponding to the line of action of the driving force applied to the Fresnel lens 23 via the elastic retaining unit 30 when the driving source 40B is driven with the driving waveform $DW_2$ shown in FIG. 7. The position of the center of mass O of the Fresnel lens 23 (see FIG. 2) is indicated by a point $P_0$. The X-axis, Y-axis, X'-axis, and Y'-axis all pass through the point $P_0$. In addition, the X'-axis and the Y'-axis are mutually orthogonal, and the X-axis and the Y-axis are also mutually orthogonal. The direction of a tensile force from the driving sources is defined as the positive directions of the X'-axis and the Y'-axis, and the azimuth angle of the X'-axis and the azimuth angle of the X-axis are shifted by 135 degrees relative to each other.

If the elastic forces due to the elastic retaining unit 30 are isotropic in a plane parallel to the screen 20 (see FIG. 1), when the driving forces $Fa(\theta)$ and $Fb(\theta)$ are applied to the elastic retaining unit 30 from the driving sources 40A and 40B, respectively, as shown in FIG. 8, a resultant force F acts on the center of mass O of the Fresnel lens 23 in a direction that makes an angle $\theta$ with the X'-axis. The angle $\theta$ is the phase angle $\theta$ shown in FIG. 7, and the magnitude of the resultant force F is $F_0$ shown in FIG. 7.

The resultant force F when the phase angle $\theta$ of the driving waveforms $DW_1$ and $DW_2$ of the respective driving sources 40A and 40B is $(0+360 \cdot n)$ degrees (where n represents an integer) has a direction and magnitude such that the center of mass O shifts from the point $P_0$ to a point $P_1$ on the X'-axis. Similarly, the resultant force F when the phase angle $\theta$ is $(45+360 \cdot n)$ degrees has a direction and magnitude such that the center of mass O shifts from the point $P_0$ to a point $P_2$ on the Y-axis. Similarly, the resultant force F when the phase angle $\theta$ is $(135+360 \cdot n)$ degrees has a direction and magnitude such that the center of mass O shifts from the point $P_0$ to a point $P_3$ on the X-axis. Similarly, the resultant force F when the phase angle $\theta$ is $(225+360 \cdot n)$ degrees has a direction and magnitude such that the center of mass O shifts from the point $P_0$ to a point $P_4$ on the Y-axis. Similarly, the resultant force F when the phase angle $\theta$ is $(315+360 \cdot n)$ degrees has a direction and magnitude such that the center of mass O shifts from the point $P_0$ to a point $P_5$ on the X-axis.

When the elastic forces due to the elastic retaining unit 30 are isometric in the plane parallel to the screen 20, regardless of the direction in which the resultant force F is assumed to point, an elastic force in the opposite direction to this resultant force F is exerted by the elastic support members 35a to 35d. As a result, when the driving sources 40A and 40B are driven with the driving waveforms $DW_1$ and $DW_2$, respectively, the center of mass O of the Fresnel lens 23 effectively moves along a circumference of a circle Cr with the radius $F_0$.

Figure 9:
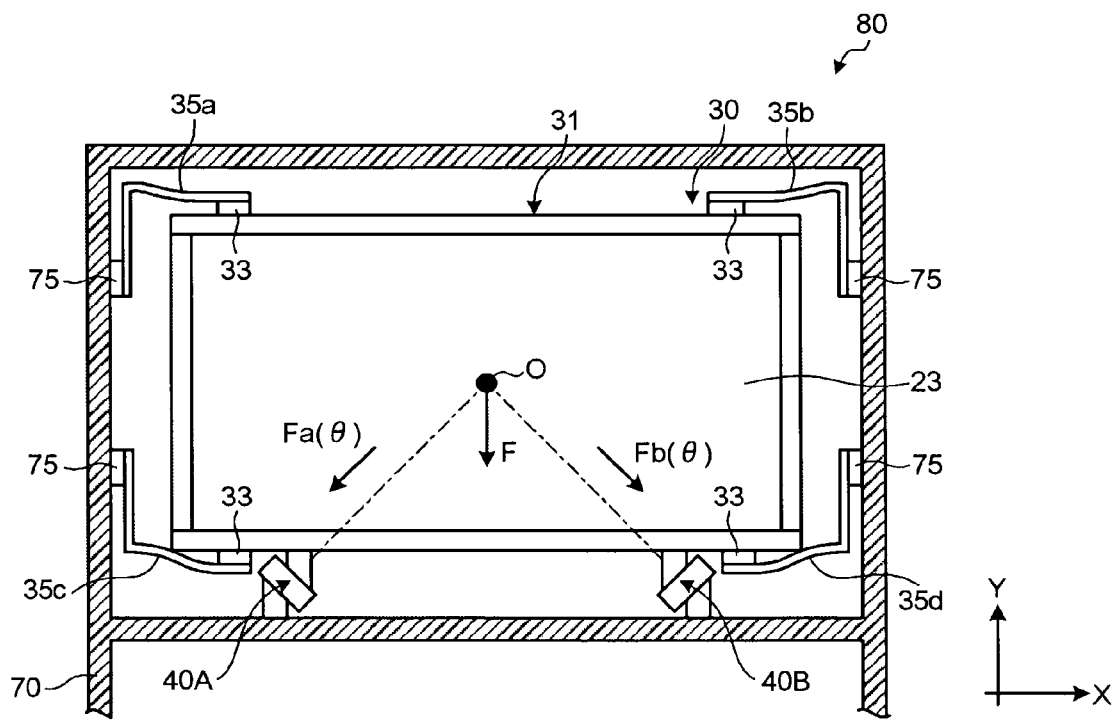
FIG. 9 is a schematic diagram showing an example of the relationship between the force acting on the Fresnel lens and the position of the Fresnel lens inside the projection-type image display device shown in FIGS. 1 and 2.
Figure 10:
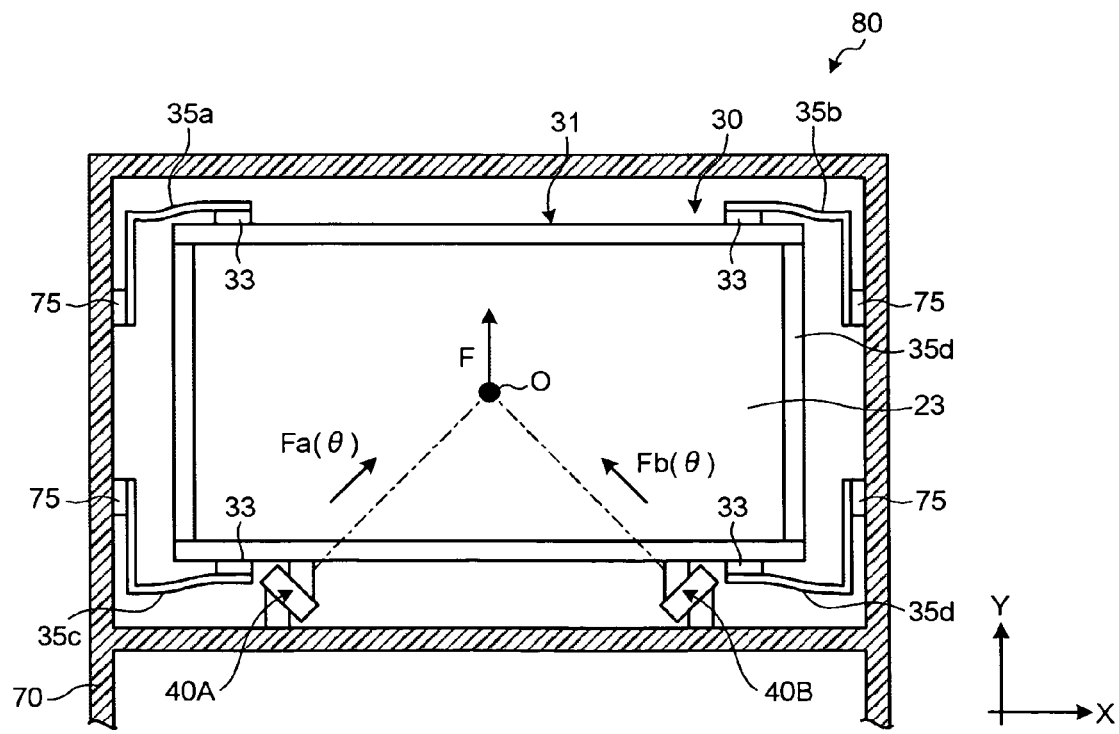
FIG. 10 is a schematic diagram showing another example of the relationship between the force acting on the Fresnel lens and the position of the Fresnel lens inside the projection-type image display device shown in FIGS. 1 and 2.
Figure 11:
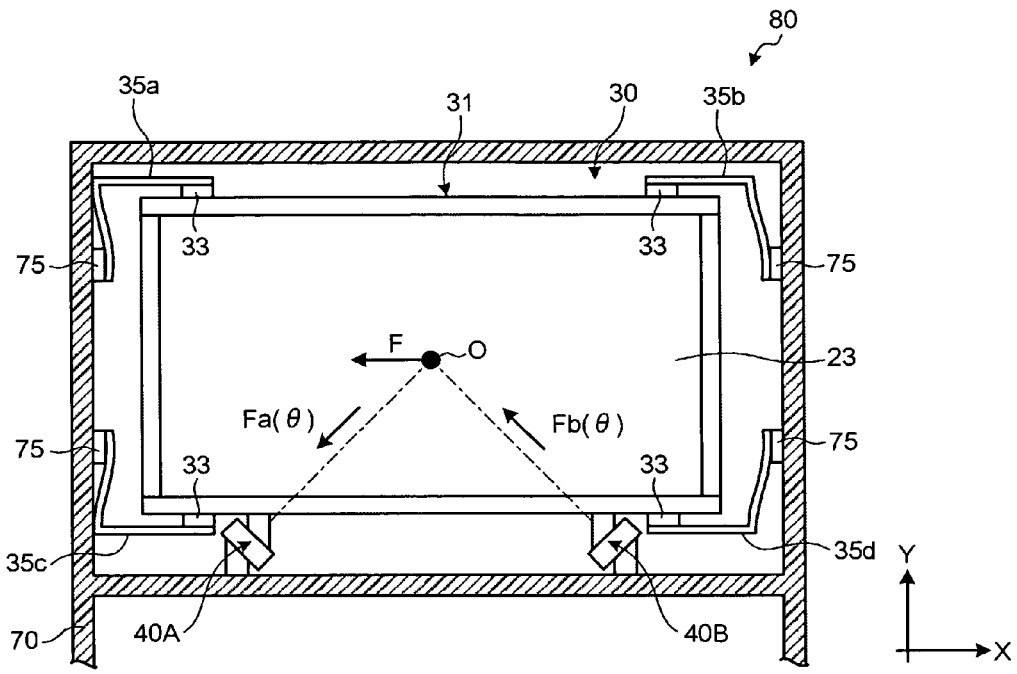
FIG. 11 is a schematic diagram showing yet another example of the relationship between the force acting on the Fresnel lens and the position of the Fresnel lens inside the projection-type image display device shown in FIGS. 1 and 2.

FIGS. 9 to 11 are each schematic diagrams showing an example of the relationship between the force acting on the Fresnel lens 23 and the position of the Fresnel lens 23 in the projection-type image display device 80. Because the individual members shown in these figures have already been described with reference to FIG. 2, these members are assigned the same reference symbols as those used in FIG. 2, and a description thereof is omitted here.

As shown in FIG. 9, when the phase angle $\theta$ of the driving waveforms $DW_1$ and $DW_2$ is $(45+360 \cdot n)$ degrees, a downward resultant force F is generated along the Y-axis of the screen 20 (see FIG. 1); as a result, the center of mass o of the Fresnel lens 23 moves directly downward as viewed from the initial position, that is, towards point $P_2$ shown in FIG. 8. As shown in FIG. 10, when the phase angle $\theta$ of the driving waveforms $DW_1$ and $DW_2$ is $(225+360 \cdot n)$ degrees, an upward resultant force F is generated along the Y-axis of the screen 20; as a result, the center of mass O of the Fresnel lens 23 moves directly upward as viewed from the initial position, that is, towards point $P_4$ shown in FIG. 8. As shown in FIG. 11, when the phase angle $\theta$ of the driving waveforms $DW_1$ and $DW_2$ is $(315+360 \cdot n)$ degrees, a leftward resultant force F, in a rear view of the Fresnel lens 23, is generated along the X-axis of the screen 20; as a result, the center of mass O of the Fresnel lens 23 moves to the left as viewed from the initial position (towards the left when viewed from the rear), that is, towards the point $P_5$ shown in FIG. 8.

When a rotational component about an axis orthogonal to the plane of the drawing in FIG. 2 is applied to the Fresnel lens 23, the locus of the motion becomes, for example, an ellipse, and the linear velocity of the motion varies periodically, manifesting as a fluctuation in scintillation, thus degrading the image quality. If the center of mass O of the Fresnel lens 23 moves in a prescribed direction according to the phase angle θ, as described above, the Fresnel lens 23 undergoes continuous circular motion in a plane parallel to the screen (see FIG. 1). At this time, because the driving forces Fa(θ) and Fb(θ) are applied in directions passing through the center of mass O, by setting the elastic forces (spring constants) of the elastic support members 35a to 35d of the elastic retaining unit 30 holding the Fresnel lens 23 to the same values in both the X-axis direction and the Y-axis direction, the Fresnel lens 23 exhibits circular motion as indicated by the arrow A in FIG. 2, without rotating its orientation about an axis perpendicular to the plane of the drawing. Therefore, no scintillation fluctuation occurs.

In the projection-type image display device 80, thus, the Fresnel lens 23 makes continuous motion in a plane parallel to the screen 20 when projecting an image. Therefore, it is possible to reduce scintillation without causing a reduction in image quality. In addition, because the screen driving unit 60 (see FIG. 2) does not include any sliding parts, it is possible to effectively eliminate operating noise when the Fresnel lens 23 makes the continuous motion.

In a typical projection-type image display device, an optical engine is generally installed at the bottom area inside a housing, and a comparatively large space, called a "skirt", is provided at the bottom. The driving sources 40A and 40B can be placed in the skirt. By placing the driving sources 40A and 40B in the skirt, an increase in the height of the projection-type image display device 80 can be prevented. In addition, when using leaf springs like that shown in FIG. 4 as the elastic support members 35a to 35d (see FIG. 2), it is straightforward to construct the elastic retaining unit 30 at low cost.

The pair of driving sources constituting the screen driving unit of the projection-type image display device can be positioned so that the directions of the driving forces from the driving sources form a desired angle less than 180 degrees. The angle is not limited to the 90 degree angle described in the first embodiment. The phrase "angle which the driving forces from the driving sources form" means the angle which the axes form in the first quadrant, assuming a coordinate system whose axes are defined by the lines of action of the driving forces, with the directions of the tensile forces due to the individual driving sources taken as the positive directions.

By defining the phase difference Δφ between the driving waveform of one driving source and the driving waveform of the other driving source as (180−α), where the angle described above is given by α degrees, it becomes easy to make the driven member undergo continuous motion in a plane parallel to the screen. At this time, if the individual driving sources are disposed so that the driving forces therefrom pass through the center of mass of the driven member, it is easy to eliminate the influence of moments.

Figure 12:
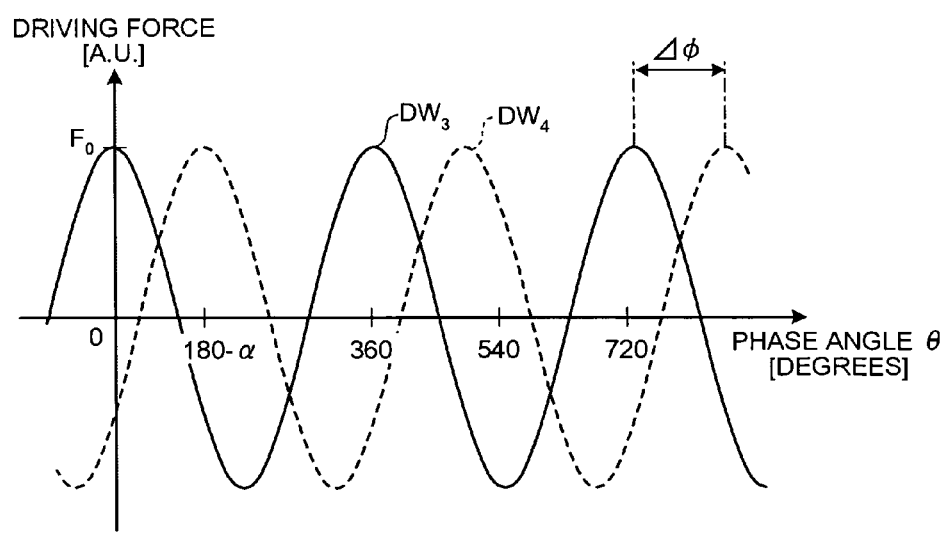
FIG. 12 is a schematic diagram showing other examples of the driving waveform of each driving source in a projection-type image display device according to a second embodiment of the present invention.

FIG. 12 depicts exemplary driving waveforms of the driving sources according to a second embodiment of the present invention. The driving sources are disposed so that the directions of the driving forces on the elastic retaining unit form a desired angle α (degrees) of less than 90 degrees. A driving waveform $DW_3$ represents a driving waveform of one of the driving sources (hereinafter, "first driving source"), and a driving waveform $DW_4$ represents a driving waveform of the other driving source (hereinafter, "second driving source"). The phase difference Δφ between the driving waveforms $DW_3$ and $DW_4$ is (180−α) degrees. The horizontal axis in the figure is the phase angle θ, and the vertical axis is the driving force applied to the elastic retaining unit from the individual driving sources. The driving force on the vertical axis is defined as positive for a tensile force applied to the elastic retaining unit, and negative for a compressive force.

A driving force Fa(θ) applied to the elastic retaining unit from the first driving source is a function of the phase angle θ, as given by Equation (iii) below:

$$Fa(\theta)=F_0 \cdot \sin(\theta+90°) \quad \text{(iii)}$$

Similarly, a driving force Fb(θ) applied to the elastic retaining unit from the second driving source is also a function of the phase angle θ, given by Equation (iv) below:

$$Fb(\theta)=F_0 \cdot \sin(\theta-90°+\alpha) \quad \text{(iv)}$$

The resultant force F of these driving forces Fa(θ) and Fb(θ) actually acts on the center of mass O of the driven member (i.e., the Fresnel lens).

The configuration of the projection-type image display device in which the driving sources are driven with the driving waveforms $DW_3$ and $DW_4$ described above can be made identical to that of the projection-type image display device 80, except for the placement of the driving sources. Moreover, in the same manner as the magnitude of the force $F_0$ in Equations (i) and (ii), the magnitude of the force $F_0$ in Equations (iii) and (iv) is selected in advance in view of the elastic forces of the elastic support members 35a to 35d constituting the elastic retaining unit 30 (see FIG. 2), the width of the allowable moving range of the center of mass O when the Fresnel lens 23 performs continuous motion, and so forth.

Figure 13:
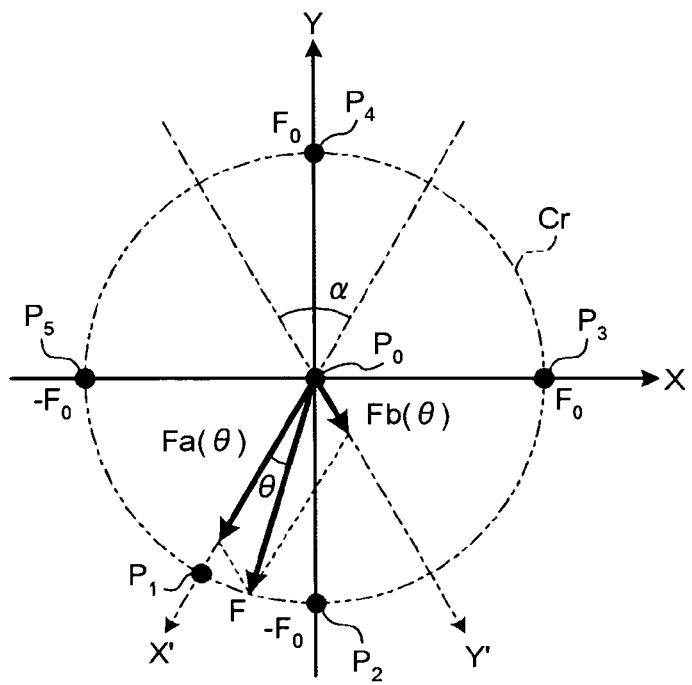
FIG. 13 is a conceptual diagram showing an example of the relationship between the phase angle and the force acting on the center of mass of a driven member, in the projection-type image display device in which the driving sources are operated with the respective driving waveforms shown in FIG. 12.
Figure 14:
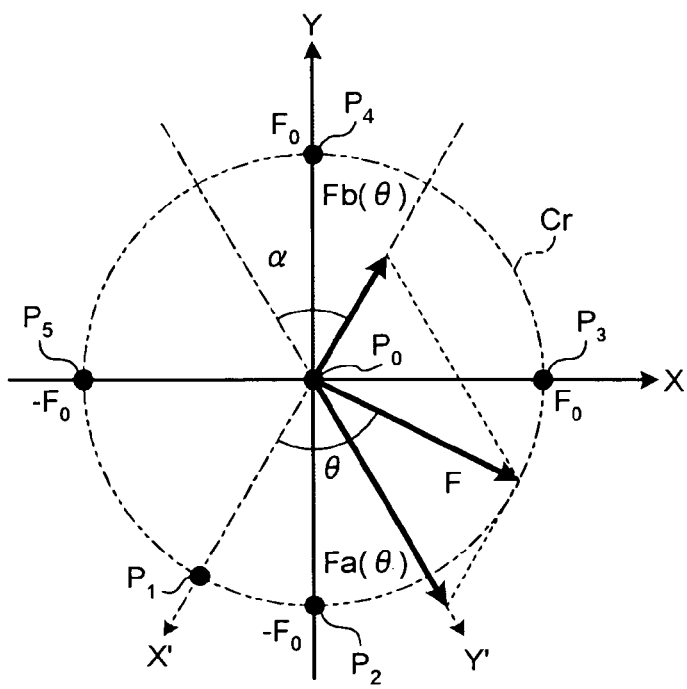
FIG. 14 is a conceptual diagram showing another example of the relationship between the phase angle and the force acting at the center of mass of the driven member in the projection-type image display device, in which the driving sources are operated with the respective driving waveforms shown in FIG. 12.

FIGS. 13 and 14 are conceptual diagrams showing examples of the relationship between the phase angle and the force acting on the center of mass of the driven member (Fresnel lens) in a projection-type image display device having the same configuration as the projection-type image display device 80, except for the different positions of the driving sources. The relationships shown in these figures are for when the driving sources are driven with the driving waveforms shown in FIG. 12. In these figures, elements that are the same as those shown in FIG. 8 are assigned the same reference symbols as used in FIG. 8.

If the elastic forces due to the elastic retaining unit 30 are isometric in a plane parallel to the screen 20 (see FIG. 1), when the above driving forces Fa(θ) and Fb(θ) are applied to the elastic retaining unit 30 from the respective driving sources 40A and 40B, a resultant force F of the driving forces Fa(θ) and Fb(θ)) on the center of mass O of the Fresnel lens 23 is generated in a direction forming an angle θ with the X'-axis. The angle θ formed here corresponds to the phase angle θ shown in FIG. 12, and the magnitude of the resultant force F is the same as that of $F_0$ shown in FIG. 12.

The resultant force F when the phase angle θ of the driving waveforms $DW_3$ and $DW_4$ of the respective driving sources 40A and 40B is (0+360·n) degrees (where n represents an integer) has a direction and magnitude such that the center of mass O of the Fresnel lens 23 shifts from point $P_0$ to point $P_1$ on the X'-axis, the resultant force F when the phase angle θ is (α/2+360·n) degrees has a direction and magnitude such that the center of mass O shifts from point $P_0$ to point $P_2$ on the Y-axis, and the resultant force F when the phase angle θ is (α/2+90+360·n) degrees has a direction and magnitude such that the center of mass O shifts from point $P_0$ to point $P_3$ on the X-axis. Moreover, the resultant force F when the phase angle θ is (α/2+180+360·n) degrees has a direction and magnitude such that the center of mass O shifts from point $P_0$ to point $P_4$ on the Y-axis, and the resultant force F when the phase angle θ is (α/2+270+360·n) degrees has a direction and magnitude such that the center of mass O shifts from point $P_0$ to point $P_5$ on the X-axis.

When the elastic forces due to the elastic retaining unit 30 are isometric in the plane parallel to the screen 20, regardless of the direction in which the resultant force is assumed to point, an elastic force in the opposite direction to this resultant force F is exerted by the elastic support members 35a to 35d.

As a result, when the driving sources 40A and 40B are driven with the driving waveforms $DW_3$ and $DW_4$, respectively, the center of mass O of the Fresnel lens 23 effectively moves along a circumference of a circle Cr with radius $F_0$.

In the same manner as the projection-type image display device 80, in the projection-type image display device according to the second embodiment, it is possible to reduce scintillation without causing a drop in image quality. In addition, by subjecting the Fresnel lens to the circular motion, it is possible to effectively eliminate operating noise. Also, it is straightforward to construct the elastic retaining unit at low cost.

Figure 15:
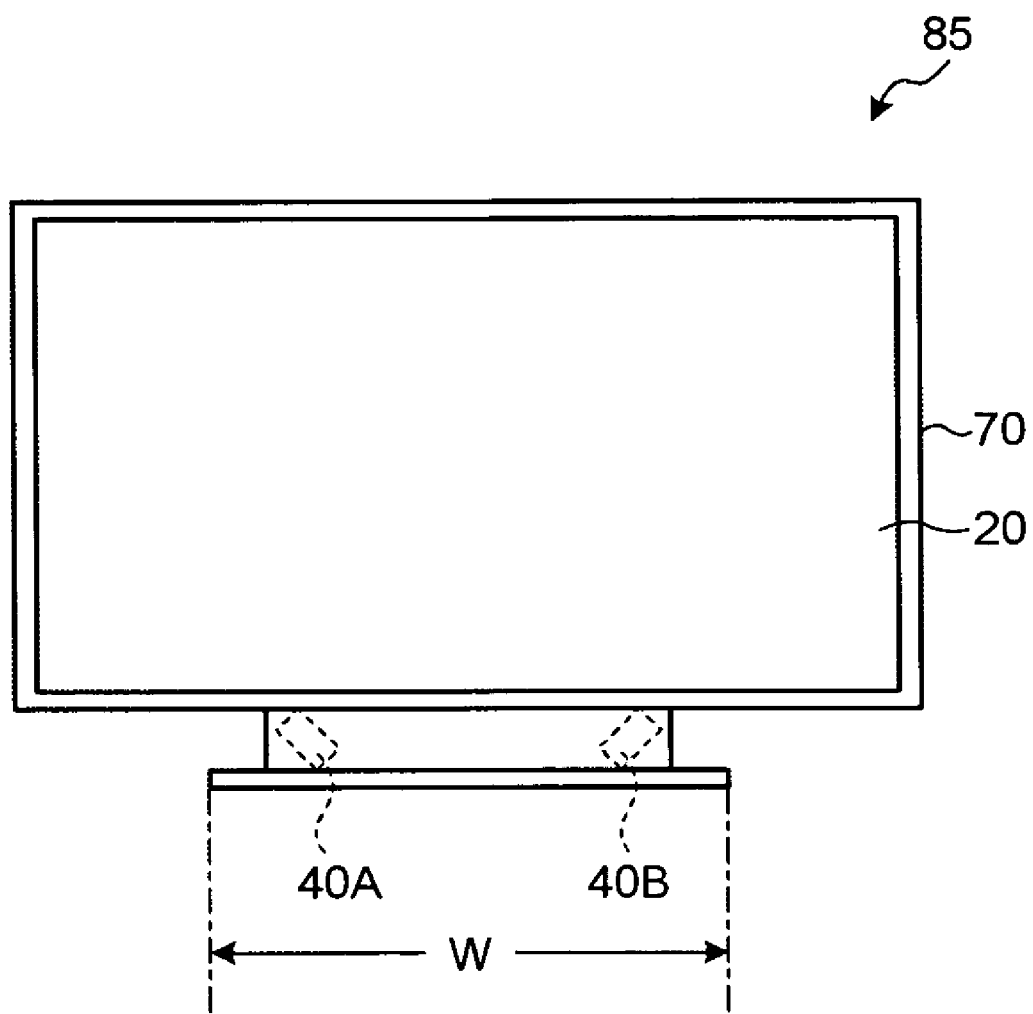
FIG. 15 is a front elevational view schematically showing a projection-type image display device according to a third embodiment of the present invention.

Furthermore, it is also straightforward to effectively avoid an increase in height of the projection-type image display device caused by the placement of the driving sources, and because the gap between the driving source 40A and the driving source 40B is easily reduced, it is also straightforward to realize a slim design in which the width W in an elevational view of the lower portion of the device is reduced, like a projection-type image display device 85 shown in FIG. 15, for instance, according to a third embodiment of the present invention. Reference symbol 20 in FIG. 15 indicates a screen, and reference symbol 70 indicates a housing.

The projection-type image display devices of the present invention have been described by way of the above embodiments. As described earlier, however, the present invention is not limited to the above embodiments. For example, the driven member made to undergo elliptical motion by the screen driving unit may be the diffusing member 25 (see FIG. 1), instead of the Fresnel lens 23.

Also, the total number of elastic support members constituting the screen driving unit is not limited to four. An arbitrary number of elastic support members can be employed so that the driven member can be elastically supported in an isometric fashion in a plane parallel to the screen. For example, to restrict the deformation in the Z-axis direction of the driven member (see FIG. 3), the elastic support members may be positioned close to the center of the upper edge or the center of the lower edge of the driven member. The structure of the individual elastic support members can be appropriately modified.

It is also possible to use linear actuators other than linear motors as the driving sources, and the operating principle thereof can be appropriately modified. Also, the driving sources can be more than two. The driving sources can be driven based on driving waveforms that are appropriate to the form of the continuous motion to be applied to the driven member when projecting an image. In the projection-type image display devices of the present invention, apart from those described above, various changes, modifications, combinations, and so forth are also possible.

In the projection-type image display devices of the present invention, it is possible to reduce scintillation, even when a laser oscillator is used as a light source.- In addition, because it is not necessary to vibrate the screen in a direction normal to the image display surface thereof, reduced image quality caused by image jitter or a decrease in resolution is also unlikely to occur. Therefore, it is easy to reduce scintillation without causing a reduction in image quality. As a result, it is straightforward to provide a projection-type image display device with high resolution and superior image quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projection-type image display device comprising:
    an optical engine that emits light in response to an image signal;
    a screen that includes a Fresnel lens that converts the light incident thereon from the optical engine to substantially collimated light, and a diffusing member that converts the collimated light incident thereon from the Fresnel lens to a diffuse light;
    a screen driving unit that displaces any of the Fresnel lens and the diffusing member, serving as a driven member, in a plane parallel to the screen; and
    a housing that accommodates the optical engine, the screen, and the screen driving unit,
    wherein the screen driving unit includes
        an elastic retaining unit that is supported on the housing and that holds the driven member so as to be capable of displacing in the plane parallel to the screen;
        a pair of driving sources that apply driving forces to the elastic retaining unit in mutually intersecting directions each at an angle substantially greater than 0 degrees and substantially less than 90 degrees with respect to the horizontal axis of the plane parallel to the screen; and
        a control circuit that drives the pair of driving sources with driving waveforms having a prescribed phase difference therebetween,
    wherein, when projecting an image on the screen, the driving forces are applied to the elastic retaining unit from the pair of driving sources to cause the driven member to make continuous motion in the plane parallel to the screen.

2. The projection-type image display device according to claim 1, wherein the pair of driving sources apply the driving forces in directions passing through a center of mass of the driven member held by the elastic retaining unit.

3. The projection-type image display device according to claim I, wherein
    the pair of driving sources are axisymmetrically arranged, with any of a horizontal axis and a vertical axis of the screeirdefined as an axis of symmetry, and
    when an angle between the directions of the driving forces from the pair of driving sources is defined as α degrees, the driving waveforms of the pair of driving sources are sinusoidal waveforms having a phase difference of (180-α) degrees.

4. The projection-type image display device according to claim 3, wherein the angle is 90 degrees.

5. The projection-type image display device according to claim 1, wherein the pair of driving sources are both disposed below the screen.

6. The projection-type image display device according to claim 1, wherein the pair of driving sources are both linear actuators.

7. The projection-type image display device according to claim 1, wherein the pair of driving sources are both linear motors.

8. The projection-type image display device according to claim 1, wherein the driven member is the Fresnel lens.

* * * * *